May 27, 1924.

B. E. MEACHAM

ADJUSTABLE OVEN

Filed Feb. 21, 1923

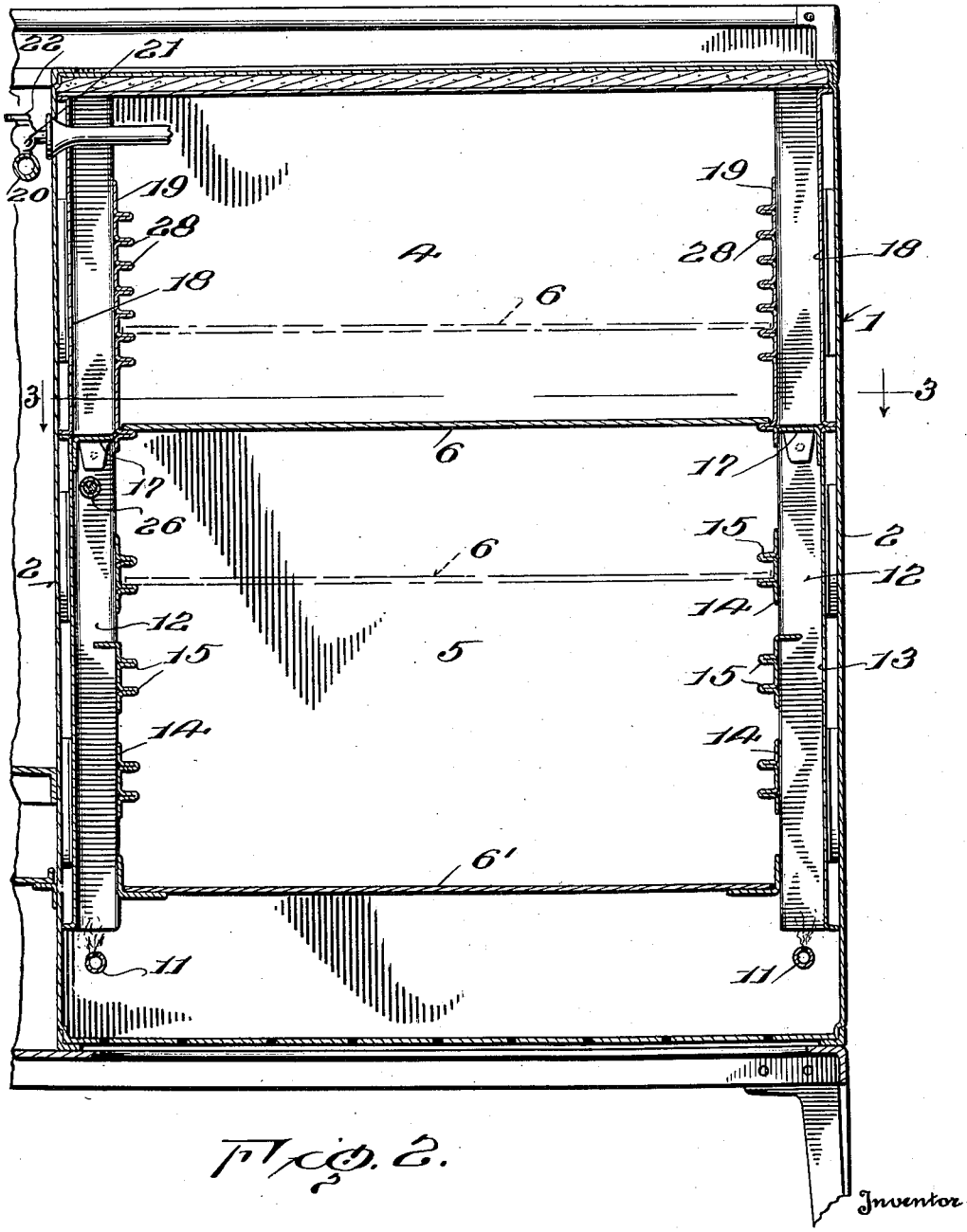

May 27, 1924.
B. E. MEACHAM
ADJUSTABLE OVEN
Filed Feb. 21, 1923
1,495,862
3 Sheets-Sheet 3
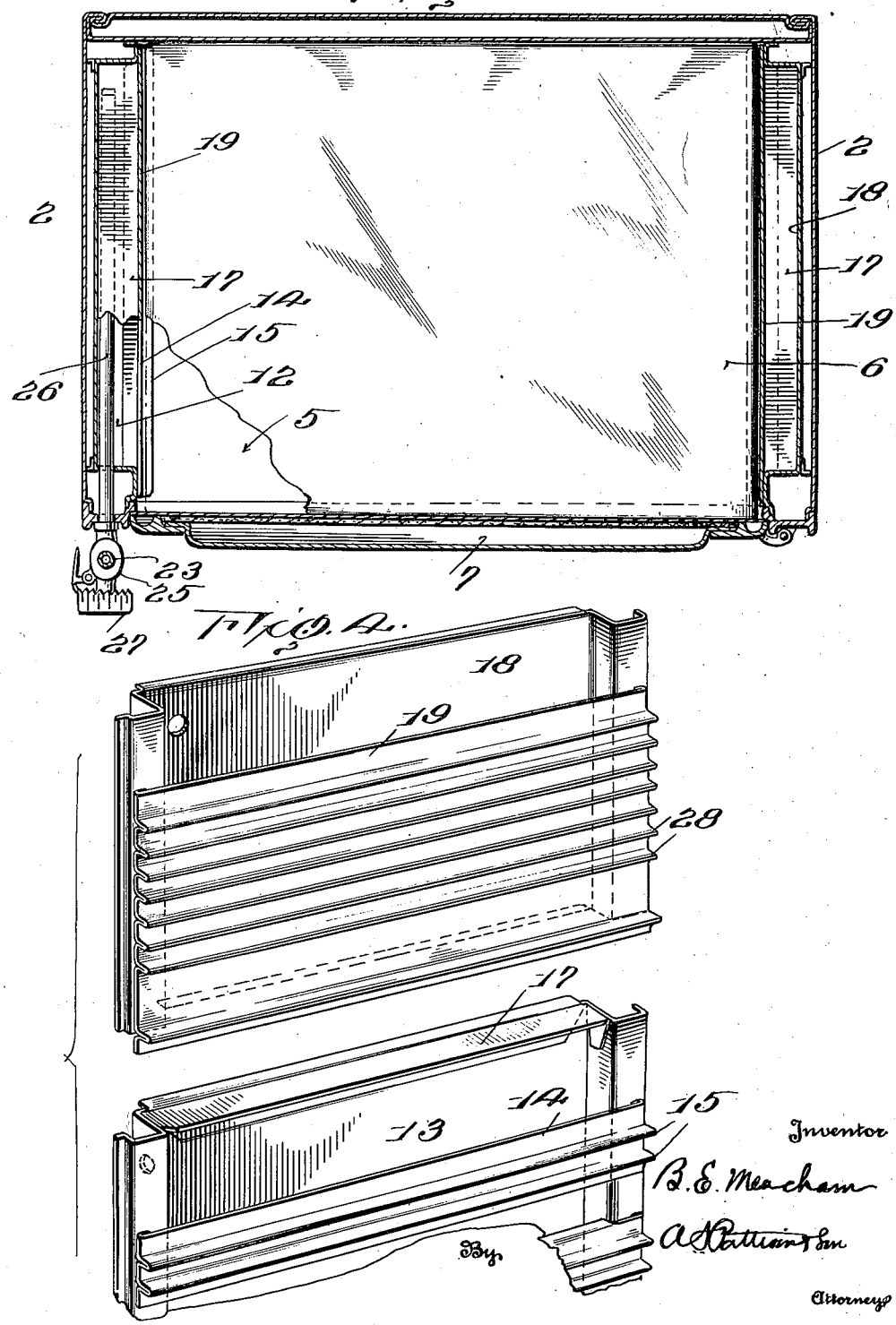

Patented May 27, 1924.

1,495,862

UNITED STATES PATENT OFFICE.

BENJAMIN E. MEACHAM, OF LORAIN, OHIO, ASSIGNOR TO AMERICAN STOVE COMPANY, OF ST. LOUIS, MISSOURI, A CORPORATION OF NEW JERSEY.

ADJUSTABLE OVEN.

Application filed February 21, 1923. Serial No. 620,417.

*To all whom it may concern:*

Be it known that I, BENJAMIN E. MEACHAM, a citizen of the United States, residing at Lorain, in the county of Lorain and State of Ohio, have invented certain new and useful Improvements in Adjustable Ovens, of which the following is a specification, reference being had therein to the accompanying drawing.

This invention relates to improvements in adjustable ovens, and it has relation to a range having a broiling oven and a baking oven, one located above the other, and the present improvement pertains to means whereby either the broiling oven or the baking oven may be enlarged vertically to meet the requirements of either oven without changing the horizontal size of the oven construction.

By means of my invention the user may enlarge either oven vertically beyond its normal size, for accommodating, for instance, in a broiling oven a fowl or large fish, and when the broiling oven is not being used the baking oven may be enlarged vertically where whole meals are cooked in the oven with thermostatic control.

By means of the adjustable oven expense is saved in making ranges of different sizes to provide an oven with sufficient capacity to meet the demands. It enables the same size range and the same size oven to be used and at the same time capable of vertical adjustment for the purposes above set forth.

The particular construction which enables my invention to be carried out will be fully described hereinafter, and further objects of the invention will appear from the following description.

In the accompanying drawings:

Fig. 2 is a vertical transverse section taken through the center of the oven.

Fig. 3 is a horizontal sectional view on the line 3—3, looking in the direction indicated by arrow, a part of the device being broken away to show the thermostat.

Fig. 4 is a detached perspective view of the two parts of one side of the lining, said parts being shown in separated relation.

Figure 1:
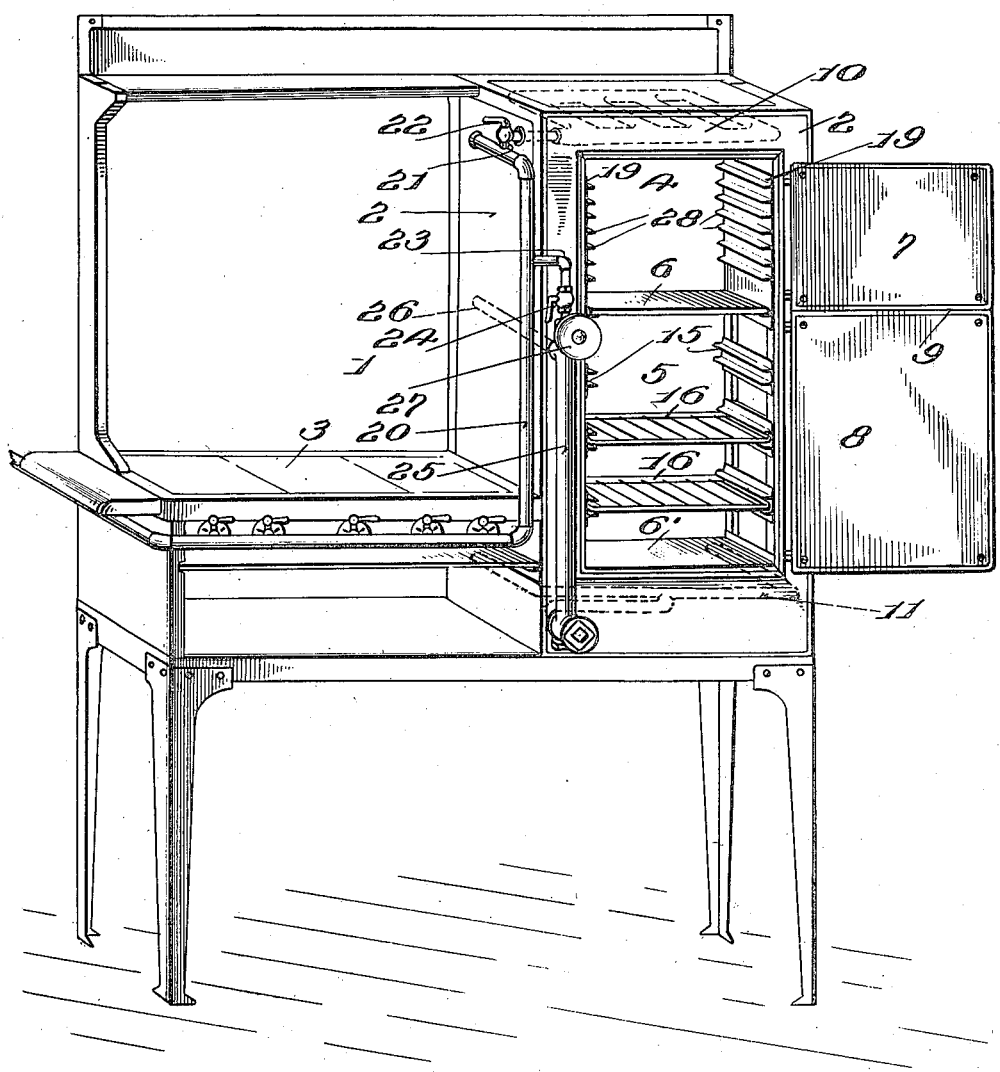
Figure 1 is a perspective view of a range which embodies an oven having my present improvement.

Referring now to the drawings in which like parts have the same reference characters, 1 is a gas range having at one side a vertical oven construction 2, and at the left of the oven construction is an oven burner construction 3, the particular construction not being shown.

Referring now particularly to the oven 2, to which my present invention relates, it comprises a vertically elongated rectangular structure which embodies a broiling oven 4, and below it a baking oven 5. The two ovens are separated by a division wall 6, which in the position shown in Fig. 1, is the normal position of the division wall. I provide a broiling oven door 7 and below it a baking oven door 8, both doors being separately movable to closed and open positions. In my present construction, the doors 7 and 8 engage at their meeting edges 9 so that when they are closed, there is a tight joint between the doors without the intervention of the usual stationary center piece, such as is found in ovens. Also in my improved construction, the division wall 6 fits in the oven and comes out to and substantially against the doors for the purpose of making a tight joint.

In my present construction, I provide at the top of the broiling oven a broiling burner 10, and at the bottom of the baking oven 5, I provide a baking burner 11. Attention is called to the fact that the baking burner 11 is U-shaped in cross-section so that the burner is located under vertical passageways 12, so that the flame from the burner flows up into these passage-ways. These passage-ways 12 are formed by outer linings 13 and inner linings 14, the said inner linings being provided with inwardly extending projections 15, for the purpose of supporting the racks 16, and also for supporting the division wall 6. At the upper end of the lining 13 there is an inwardly extending flange 17, that serves to close the air spaces 12 of the baking oven, so that when the baking oven is operating the outflowing hot air is intercepted at that point.

The lining for the broiling oven comprises an outer wall 18, and an inner fluted wall 19, whereby racks similar to 16 may be supported thereon for adjusting toast or other small articles close to the burner flame 10.

The gas supply flows through a pipe 20 to the broiling burner, as shown at 21, at which point there is a valve 22 for controlling the flow of gas. Gas also flows through the pipe 20, through the pipe 23, thence through a valve 24 to the housing 25 through which the gas flows downward to the burner 11. This housing 25 has connected at its upper end a thermostat 26, which extends into the upper end of the air-passage 12. The thermostat for controlling the flow of gas to the burner 11 is controlled by a suitable wheel 27, and the thermostatic mechanism as shown substantially in my Patent No. 1,236,335, dated August 7th, 1917 is used, whereby the flow of gas to the burner 11 is controlled for the purpose specified in the said patent. Reference is made to the said patent for a description of the thermostat and its operation.

By means of the thermostat, any desired degree of heat may be maintained in the baking oven. That is to say, the heat is retained in the baking oven at the desired degree for cooking a whole meal when it is desired. Such cooking is usually done in ranges of this type, used in modern kitchens of apartments and small houses.

Attention is directed to the fact that the inner walls of the doors 7 and 8 are so constructed that they will make a tight fit against the adjustable division-wall 6, as it may be moved up for enlarging the baking oven, and may be moved down for enlarging the broiling oven. By reason of this construction therefore, a tight joint will be made between the doors for the adjustment of the division wall 6.

From the foregoing description it will be observed that my improved vertical adjustable oven involves two burners, one located at the bottom of the baking oven and the other one is located at the top of the broiling oven. This invention is not adapted for that type of oven which does not involve two burners, because the adjustability of a single oven is undesirable since it can be made of any desired dimension. When, however, the adjustable feature is combined in an oven of the type here shown and described, it enables the broiling oven to be enlarged and it also enables the baking oven to be enlarged, and without the necessity of having a large oven. It enables the ovens to be enlarged to accommodate the larger amount of food and it fills a condition which has not heretofore been provided for. It enables an oven of a relatively small horizontal size to be enlarged vertically, thus making the relatively small sized oven of sufficient capacity to meet the needs of a family, which could not be done in any other form of oven without enlarging the range horizontally.

When it is desired to increase the size of the broiling oven to accommodate a fowl or a large fish which must be broiled slowly, the division wall 6 is moved down into one of the supports 15, and on the other hand when it is desired to enlarge the baking oven, the division wall 6 is moved up on either of the supports 28, and in any of the adjustable positions of this division wall 6, the inner walls of the doors 7 and 8 are so constructed, and the division wall made of such dimension as to substantially form a tight joint.

This construction and arrangement avoids the necessity and expense of making different sized ovens, which otherwise would be the case in order to meet the requirements when a larger broiling oven or baking oven is desired to meet the conditions.

Having thus described my invention, what I claim and desire to secure by Letters Patent is:—

1. In a gas range, the combination of an uninterrupted housing, a burner within the top of the housing, a burner at the lower end of the housing, the housing having a door for its upper portion and a door for its lower portion, the adjoining edges of the said doors being in substantial engagement, and a vertically adjustable division wall dividing the housing into an upper broiling oven and a lower baking oven, the inner walls of the doors and the division plate substantially engaging, for the purpose described.

2. In a gas range, the combination of a vertically elongated housing having one end forming a baking oven provided with a door, its other portion forming a broiling oven provided with a door, a burner located at the top of the housing, a burner located at the bottom of the housing, a vertically movable imperforate division wall between its upper and lower portions, said division wall of an area to substantially fit against the inner side walls of the doors, whereby either end of the housing may be enlarged vertically, for the purpose described.

3. In a gas range, the combination of a vertical housing having its upper part forming a broiling oven and its lower part a baking oven, a broiling burner located in the upper part of the housing and a baking oven in the lower part of the housing, a vertically movable division wall substantially imperforate between said ovens, separate doors for the said ovens having their adjacent edges substantially engaging each other, the inner walls of the doors formed flush throughout and the said division wall of a width to substantially fit against the walls of the doors in its various adjustments.

4. In a gas range, the combination of a vertical housing having its upper part forming a broiling oven and its lower part a baking oven, the lower part having a lining forming vertical air-passages, burners below the air-passages, a bottom for the said oven substantially above the said burner, a broiling burner in the top of the housing, doors for the ovens, a vertically adjustable division wall, and flanges extending across the air passages and closing them intermediate their ends the parts combined for the purpose described.

In testimony whereof I hereunto affix my signature.

BENJAMIN E. MEACHAM.